United States Patent [19]

Brant

[11] 4,027,404
[45] June 7, 1977

[54] PAINT SET AND TEACHING AID

[75] Inventor: Robert D. Brant, Roseville, Mich.

[73] Assignee: Palmer Paint Products, Inc., Troy, Mich.

[22] Filed: May 20, 1976

[21] Appl. No.: 688,196

[52] U.S. Cl. .................................. 35/28.5; 206/1.8
[51] Int. Cl.² ....................................... G09B 11/10
[58] Field of Search ............ 35/28.3, 28.5; 206/1.7, 206/1.8; 220/352, 356

[56] References Cited

UNITED STATES PATENTS 3,768,689  10/1973  Gauthier ............................ 220/356
3,777,414  12/1973  Robinson .......................... 35/28.5

Primary Examiner—Harland S. Skogquist
Attorney, Agent, or Firm—Cullen, Settle, Sloman & Cantor

[57] ABSTRACT

A paint teaching set which includes a base having a central portion which is provided with a circular array of equi-angularly spaced recesses adapted to replaceably receive pads containing pigments making up progressively different colors of the color spectrum. The base has a rearwardly extending integral flange which has a plurality of substantially flat, individual tab members spaced circumferentially about the periphery of the flange and radially outwardly therefrom. A resiliently firm transparent cover having a plurality of sets of distinctively different visible selector indicia thereon is provided for selecting, combining and balancing colors. The cover is adapted to be frictionally retained over the base for sliding rotation with respect thereto. The cover includes a rearwardly extending cylindrical flange integral with a circular window portion which overlays the central portion of the base and a radially outwardly extending, relatively flat lip integral with the cover flange and adjacent the end thereof. The cover flange and lip of the cover are adapted to be slideably received over the base flange and tabs of the base so as to be frictionally retained thereon for rotation with respect thereto regardless of the position of the paint set.

7 Claims, 8 Drawing Figures

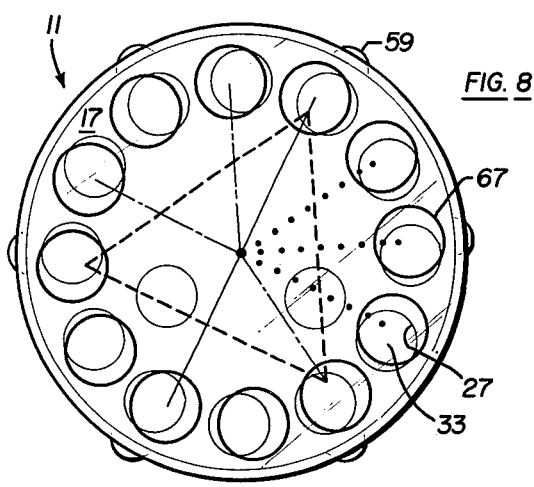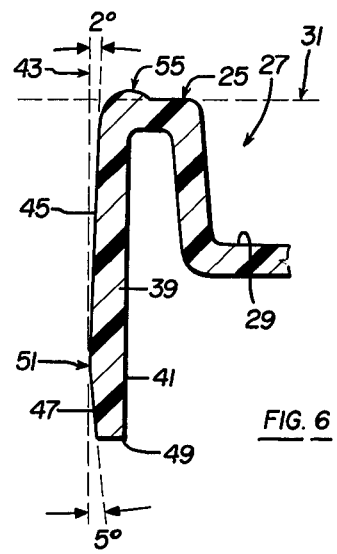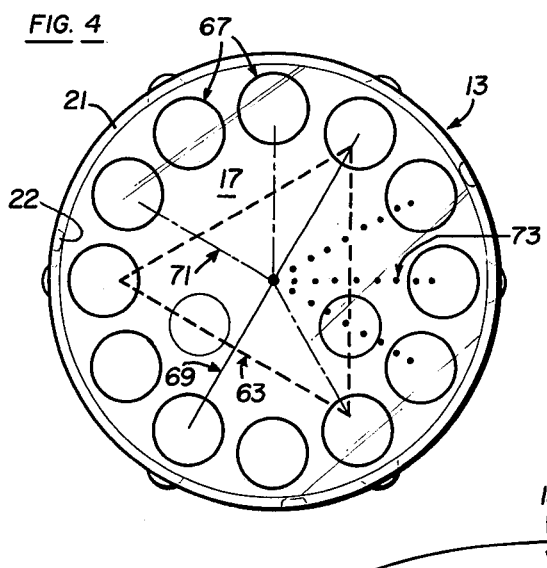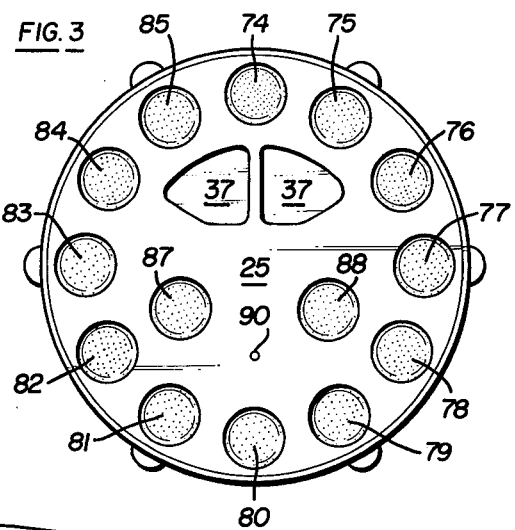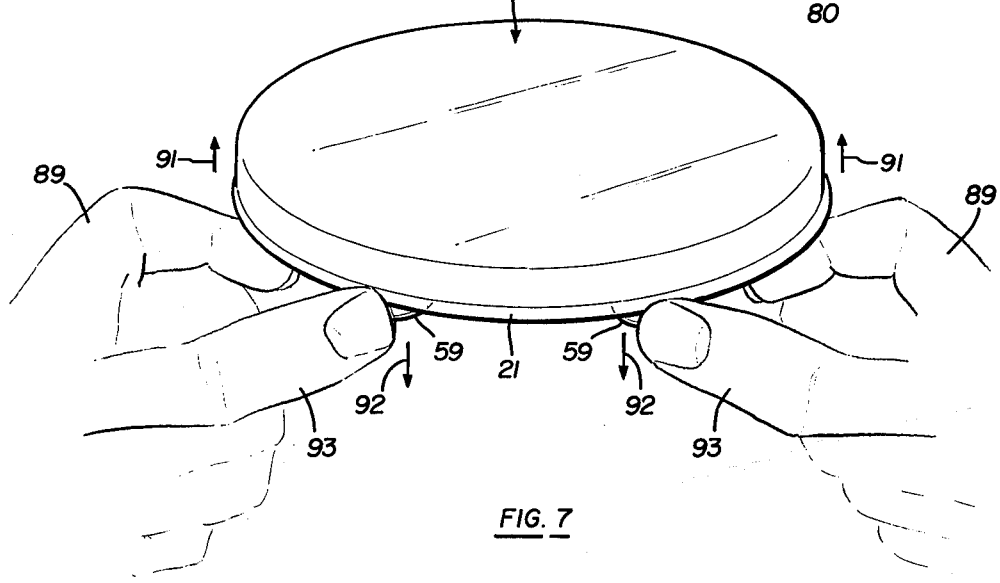

PAINT SET AND TEACHING AID

BACKGROUND OF THE INVENTION

The invention relates generally to the combination of a paint set with a rotable transparent cover to form color wheel combination, and more particularly to an improved color wheel and paint set combination having a relatively simple means whereby the transparent cover which serves as a color combination selector is rotatably mounted over and removable from a base having a circular array of paint-containing recesses therein.

This patent represents an improvement over U.S. Pat. No. 3,777,414 which issued to E. A. Robinson on Dec. 11, 1973 for a Water Color Set and Teaching Aid and which is assigned to the assignee of the present invention. The above-identified patent and the references cited therein represent the closest known prior art and are typical of the field of use of the present invention.

The prior art teaches many different types of paint sets, some of which are provided with various types of covers. similarly, the prior art teaches various devices employing color wheels or selectors to aid in choosing color combinations. The above-identified patent teaches the combination of a relatively simple transparent cover having selector indicia thereon which serves both as a removeable cover for the paint box itself and as a rotatable color selector for use in cooperation with the progressively arranged paints in the box which serve as the color wheel.

The various color wheel apparatus of the prior art were not adapted to serve as removeable covers for paint boxes and normally involved a permanent rotatable connection of a colored disk with a rotatable indicating means. Similarly, most of the paint boxes of the prior art were equipped with lids adapted to be removed therefrom or otherwise opened but were not normally equipped with rotatable covers. The above-identified patent combined these features in an arrangement whereby the transparent cover having the selector indicia thereon was removably mounted to the paint bearing base for rotation with respect thereto by means of specially curved configuration on the side of the base and on the cover flange which were designed to effect a snap-fit. Such specially designed snap-fit constructions are relatively expensive, are subject to mechanical wear, and are often difficult for children to operate.

This invention combines the paint set and teaching aid combination with an improved means whereby the dual-function transparent cover is removeably mounted for to the base portion of the set which contains the paints for rotation with respect thereto without requiring a snap-fit configuration but rather in a relatively simple, inexpensive, easy to operate manner.

SUMMARY OF THE INVENTION

The improved paint set and teaching aid combination of the present invention is adapted to serve as an aid in the teaching of novices and in further expertising others in the selection, combination and/or balancing of colors and hues of the color spectrum to achieve a more effective and artistic organization in painting The present invention utilizes a relatively rigid base having a central portion which is provided with a circular array of equi-angularly spaced recesses adapted to replaceably receive pads containing pigments making up progressively different colors of the color spectrum. The base has a rearwardly extending integral flange which has a plurality of substantially flat, individual tab members spaced circumferentially about the periphery of the flange and radially outward therefrom. A resiliently firm transparent cover having a plurality of sets of distinctively different visible selector indicia thereon is provided for selectively combining and balancing colors when used in combination with the colored pads contained in the recesses of the base. The cover is adapted to be frictionally retained over the base for sliding rotation with respect thereto. The cover includes a rearwardly extending cylindrical flange integral with a central window portion which overlays the central portion of the base and a radially outwardly extending relatively flat lip integral with the cover flange and adjacent the end thereof. The cover flange and lip of the cover are adapted to be slideably received over the base flange and tabs of the base so as to be frictionally retained thereon for rotation with respect thereto regardless of the position of the paint set and without the need for special snap-fit configurations or the like.

To insure that there is sufficient frictional force for retaining the cover over the base, the radially inner surface of the cover flange is provided with a plurality of circumferentially spaced, radially inwardly disposed frictional protrusions and the radially outwardly facing surface of the base flange is outwardly convex so as to form an annular ridge portion adapted to be frictionally engaged by said protrusions to normally prevent the inadvertent separation of cover and base.

The improved means whereby the transparent, indicia-bearing cover is removeably secured to the base which contains the spaced paint-containing recesses does not involve the complex curvatures normally required for a snap-fit arrangement. In the present invention, the rearwardly extending cylindrical flange of the cover with its spaced protrusions and its annular lip portion are disposed slideably over the rearwardly facing outwardly convex flange of the central recess-containing face of the base and over the circumferentially spaced individual tab members such that the friction between the flange portions is sufficient to retain the cover over the base even though the paint set is turned sideways or even upside down.

The cover is easily removeable by the simultaneous application of manual force against (1) the annular lip portion in a first direction generally toward the central portion of the base and to one or more of the individual tabs in the opposite direction. This causes the frictional force between the flanges to be overcome as the protrusions are slideably cammed over the annular ridge portion and allows the cover to be removed from the base for access to the various colors of the pigment-containing pads contained in the base recesses.

Another feature of the present invention provides the peripheral outer surface of the base flange with a radially outward flare and then a radially inward taper to provide an arcuate congfiguration having a ridge portion there-between so that the ridge portion contacts the inner surface of the cover flange to insure sufficient frictional force for retaining the cover thereon. The radially inwardly facing protrusions normally rotate freely within the inward taper as the cover is rotated so as to produce no rotational friction but frictionally engage the ridge portion to prevent inadvertant separation.

Additionally, the radially outer periphery of the central portion of the base may be provided with a raised portion upon which the inner surface of the window cover adjacent the periphery thereof slides to increase the ease with which the attached cover may be slideably rotated. One advantage of the configuration of the present invention is the ease with which the cover may be rotated with respect to the base while being frictionally retained thereon regardless of the position of the set.

A further advantage of the present invention resides in the fact that although the frictional contact between the base flange and the cover flange is sufficient to retain the two members together while allowing rotation of the cover with respect to the base, the cover may be quickly and easily removed for access to the paints contained in the base even by a child.

Other advantages and meritorious features of the present invention will become more fully understood from the following detailed description of the drawings and the preferred embodiment, the appended claims and the drawings which are described hereinbelow.

BRIEF DESCRIPTION OF THE DRAWINGS

FIG. 3 is a top plan view of the base, showing the variously colored pigment-containing pads within the circular array of recesses of the base with the cover removed;

FIG. 4 is a top plan view of the transparent cover with the four diagrammatic slector indicia or patterns thereon and the base removed;

FIG. 6 is an enlarged fragmentary view of the cross sectional portion of the base shown within the dotted circle of FIG. 5;

FIG. 7 is a perspective view illustrating how the cover may be manually removed from the base for access to the paints contained therein; and FIG. 8 is a top plan view of the assembled set of FIG. 2 showing the indicia-bearing cover in a partially rotated position with respect to the base.

DESCRIPTION OF THE PREFERRED EMBODIMENT

Figure 1:
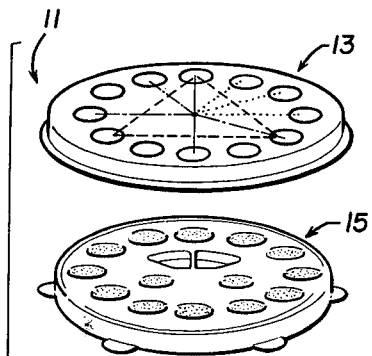
FIG. 1 is a perspective view of the paint teaching set of the present invention with the cover removed from the base.

FIG. 1 shows the combination color teaching aid and paint set or paint teaching set 11 of the present invention with the cover 13 having been removed from and positioned over the base 15. The cover 13 serves as a protective lid or cover to protect the paints contained within the base 15 and as a rotatable, transparent disk having selector indicia thereon for use with the color wheel formed by the arrangement of the paints or colors contained within the base 15 when the cover 13 is slideably received over the base 15 for rotation with respect thereto.

Figure 5:
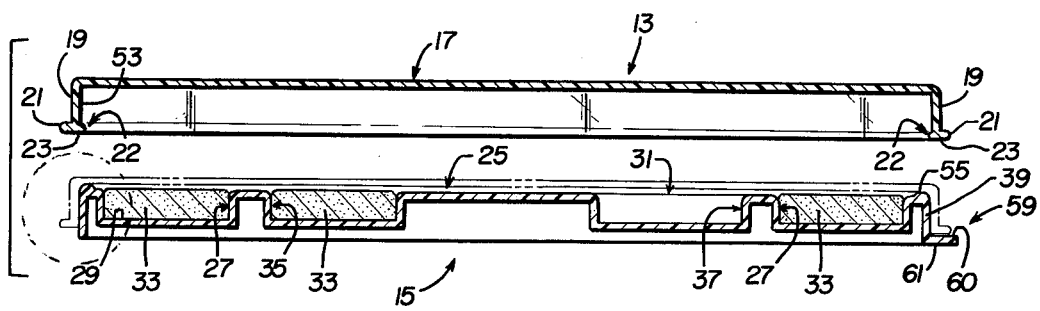
FIG. 5 is a cross sectional side view with the cover broken away from the base taken along view lines 5—5 of FIG. 2.

The structural details of the paint teaching set 11 of the present invention will be described initially with respect to FIG. 5 which illustrates the cover 13 positioned immediately over but displaced from the base 15 in solid lines and in the closed position over the base 15 in phantom lines. The cover 13 is a single unitary piece of relatively rigid, transparent, thermoplastic or thermosetting plastic material such as polystyrene or the like. The cover 13 includes a generally flat, circular, central window portion 17 having a rearwardly-extending cylindrical flange portion 19 integral therewith and extending in a direction generally normal to the plane of the window portion 17. The cover flange 19 has a relatively flat annular lip portion 21 disposed adjacent to the distal end or rim 23 of the cover flange 19 such that the plane of the lip portion 21 is substantially parallel to the plane of the window portion 17 and extends radially outwardly from the cover flange 19. The cover flange 19 also includes a plurality of circumferentially spaced, radially inwardly facing friction protrusions 22 integrally adjacent to the rim 23.

The base 15 is preferably molded from an opaque, relatively firm, yet yieldable, thermoplastic or thermosetting plastic material such as polystyrene or polyethlene, or the like so as to be self-sustaning as to shape. The base 15 includes a generally flat, circular ceneral portion 25 which is provided with a circular array of equi-angularly spaced recesses 27. The bottoms 29 of the recesses 27 are generally flat and are displaced rearwardly from the plane 31 of the central portion 25. Each of the recesses 27 is adapted to removeably or replaceably receive a pad 33 of pigment-containing material, the composition of which is conventional and forms no part of the present invention. The base 15 may also contain other pad-receiving recesses 35, paint-mixing recesses 37, or the like as hereinafter described.

The base 15 includes a rearwardly extending flange 39 integral with the radially peripheral end of the circular central portion 25 and extending circumferentially therearound. The base flange 39, as indicated with respect to FIG. 6, has a radially inward surface 41 which is generally parallel to a vertical axis 43 which is normal to the plane 31 of the central portion 25. A first radially outer surface 45 of the base flange 39 is integral with and adjacent to the central portion 25. The first radially outer surface 45 forms an acute angle, of approximately 2° in the present example, from the normal axis 43 while the second radially outer surface 47 of the base flange 39 which is disposed immedately adjacent to the substantially flat distal end or rim 49 of the base flange 39 forms an acute angle, approximately 5° in the present example, with the axis 43 as illustrated in FIG. 6. This provides a slightly arcuate, outwardly convex, radially outer surface to the base flange 39 which acts as a cam surface adapted to radially inwardly flex the flange to allow removal and replacement of this cover 13.

At the intersection of the radially outwardly flared first surface 45 with the radially inwardly tapered second surface 47, an annular ridged portion 51 is formed for frictionally engaging the radially inward surface 53 of the cover flange 19 and more particularly the frictional protrusions 22 disposed thereon to removeably retain the cover 13 over the base 15. When the cover 13 is retainably positioned over the base 15, the protrusions ride within the annular recess created by the inwardly tapered surface 47 so as to minimize rotational friction.

In the preferred embodiment, the base 15 further includes a raised annular rim portion 55 integral with the central portion 25 and the base flange 39. The raised rim portion 55 encircles the central portion 25 and extends forwardly of the plane 31 of the central portion 25 so as to be adapted for engagement with the inside radially peripheral surface 57 of the window portion 17 of the cover 13 so as to facilitate the rotation of the cover 13 with respect to the base 15 by minimizing the contact area between the inner surface of the window portion 17 and the outer rim of central portion 25 of the base 15 by presenting a relatively narrow low friction track on which the cover 13 may rotate. The raised rim portion 55 could, of course, be eliminated entirely so as to allow the cover 13 to rotate over the base 15 solely by the contact between the lip portion 21 and the tab members 59.

The base 15 further includes a plurality of substantially flat, individual tab members 59 generally parallel to the plane 31 of the central portion 25 as shown in FIGS. 1, 2, 3 and 5. The tab members 59 are integral with the base flange 39 and disposed adjacent to the distal end or rim 49 thereof. The tab members 59 extend radially outward from the base of the second radially outward surface 47 of the base flange 39 and each has its upper surface 60 adapted to slideably receive the rearward surface 23 of the lip portion 21 of the cover 13, and its lower surface 61 being generally parallel to the plane of the rim 49 and spaced rearwardly from the plane of the recess bottoms 29 for supporting the set 11 on a surface.

Referring to FIGS. 1 and 4, it will be noted that the central window portion 17 of the transparent cover 13 is provided with four predetermined sets of distinctively and differently lined, visible selector indicia viewable from above in juxtaposition relative to the differently colored pads 33 to aid in selecting, combining, and/or balancing the various colors of the spectrum. In the preferred embodiment disclosed herein, 12 circular reference indicia 67, which corresponds in dimension, radial position, and number to the circularly arranged pad-containing recesses 27 of the base 15, are inscribed upon the top surface 65 of the window portion 17 of the transparent cover 13.

The first set of selector indicia 63 is in the form of an equilateral triangle which is formed from three straight dashed lines and the apices of the triangle coincide with the centers of three equally spaced indicia reference circles 67. The triangle indicia 63 represents a so-called "triadic" indicator layout and can be used to point out three equally-spaced colors of the spectrum represented by the pads 33 within the recesses 27 of the base 15 to achieve a well-balanced harmony of colors.

A second set of selector indicia 69 is in the form of a straight solid diametral line inscribed upon the top surface 65 of the window 17 and is generally referred to as the "complementary" indicator since when one end of the line 69 points to a first color, the opposite end will point to its complement.

The third set of selector indicia 71 is generally Y-shaped and represented by three straight radial lines made up of alternating dots and dashes with the top two arms of the "Y" pointing to two reference circles 67 on either side of a third reference circle to serve as a "split complementary" indicator such that two colors from one side of the color wheel are connected to one color on the opposite side such that if the two neighboring colors were mixed together, they would make the complementary color of the third.

The fourth set of selector indicia 73 has the form of three equal length radial indicia each depicted by a straight black line of dots extending from the axial center of the window portion 17 to immediately adjoin three consecutive angularly spaced reference circles 67 so as to function as an "analogous" color indicator. The fourth indicia selector 73 points to three sequential colors in the spectrum which are closely related to provide a soft or quiet harmony.

Figure 2:
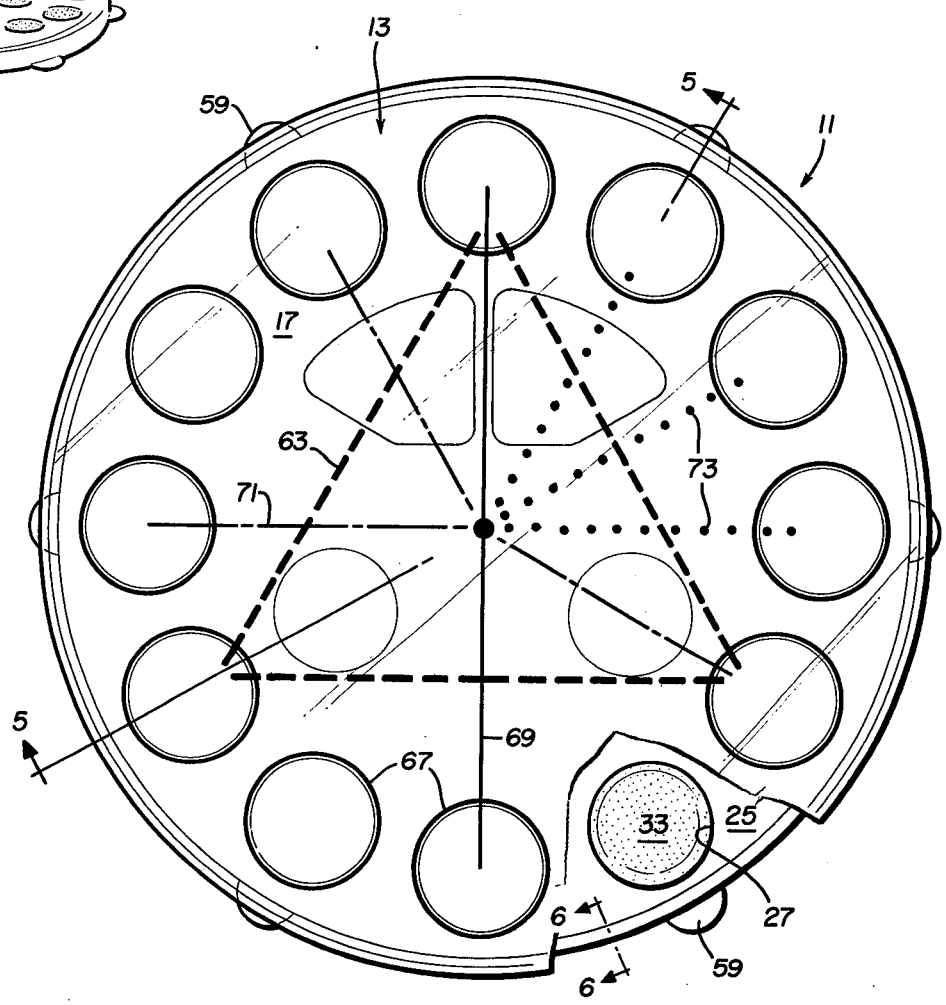
FIG. 2 is a top plan view of the assembled set showing an operational relationship of four diagrammatic selector indicia or patterns on the transparent cover top to specified ones of the pigment-containing pads of the base.

Referring to FIGS. 2 and 3, which show the base 15 and its associated components viewed from above, it is seen that the molded indentations or recesses 27 are each filled with an individually replaceable or removeable pad 33 of pigment-containing material and that the pads 33 are arranged in a predetermined sequence of progressively different colors to make up the color spectrum. While the underlying concept of the present invention may be used with any number of angularly spaced recesses 27, with the indicia-bearing cover 13 of the present invention, the invention is particularly suited to bases having the "3N" such recesses 27 so that all four of the indicia selector means may be used without complications. In the present example, "N" was set to equal 4 so that 12 different colored pads 33 are disposed in the 12 angularly spaced recesses 27 of the base 15.

The arrangement and/or placement of the colors may be altered as desired. In the present example, the colors of the pads 33, preceeding in a clockwise manner, are arranged such that reference numeral 74 is red, 75 is red-orange, 76 is orange, 77 is yellow-orange, 78 is yellow, 79 is yellow-green, 80 is green, 81 is blue-green, 82 is blue, 83 is blue-violet, 84 is violet, and 85 is red-violet. Additionally, the two additional pad-receiving recesses 35 are arranged such that a white pad 87 is provided in one of the recesses 35 while a black pad 88 is provided in the other. Additionally, a pair of generally flatbottomed cavities or recesses 37 may be provided for the palette-mixing of plural pigments, for containing water, or for containing a solution of a selected pigment or mix thereof. A venting aperture or drain hole 90 passing through the central portion 25 of the base 15 may also be provided.

In summary, the transparent cover 13 is adapted to be slideably received over the base 15 such that the radially inner surface 53 including the protrusions 22 of the cover flange 19 and the relatively flat rear surface 23 of the lip portion 21 slide over the bowed, radially outer surface 45, 47 of the base flange 39. The lower surface 23 of the lip portion 21 and the radially outward inner surface 57 of the window portion 17 slideably rest on the upper surface of the outwardly extending tab members 59 and the raised rim 55, respectively, with the protrusions 22 freely riding in the annular recess formed by the inwardly tapered surface 47, so as to allow the cover 13, when it is operatively positioned over the base 15, to be easily rotated to use the indicia-containing transparent cover in combination with the color-containing base as a color wheel. Additionally, the frictional forces exerted between the lip portion 21 and the tab members 59 and between the cover flange 19 and the base flange 39, and more particularly between the frictional protrusions 22 of the radially inner surface 53 of the cover flange 19 and the raised ridge portion 51 and the area immediately adjacent thereto of the radially outer surfaces 45 and 47 of the base flange 39 are sufficient to frictionally retain the cover 13 rotatably to the base 15 even though the set 11 is turned up-side-down or roughly handled. FIG. 8 shows the teaching paint set 11 of FIG. 2 with the cover 13 having been angularly rotated slightly in a counter-clockwise direction with respect to the base to show the rotational relationship therebetween.

On the other hand, as illustrated in FIG. 7, the set 11 may be opened with ease to allow the user access to the paint contained therein. To open the cover, pressure is manually exerted in a first direction 91 which is generally toward the plane 31 of the central portion 25 as by the finger 89 on the under surface 23 of the lip portion 21 of the cover 13, while simultaneously pressure is exerted in the opposite direction 92, as by the thumb 93 against the upper surface of the tab member 59, so as to overcome the frictional forces between the cover flange 19 and the base flange 39 by camming the protrusions 22 up to the surface 47 and over the frictional ridge 51 to separate the cover 13 from the base 15 for removing the cover 13 and allowing access to the paints contained in the base 15.

The apparatus described hereinabove provides a highly efficient, relatively inexpensive attachment means which does not require complex snap-fit type configurations, which is not generally susceptible to mechanical failure due to wear, and which is extremely easy to operate both in the rotational mode and in opening the cover for access to the paints.

With this detailed description of the specific apparatus used to illustrate the prime embodiment of the present invention and the operation thereof, it will be obvious to those skilled in the art that various modifications can be made in the present construction and in the configuration, organization and selection of the number, and shade of the colors employed without departing from the spirt and scope of the present invention which is limited only by the appended claims.

I claim:

1. A color pigment paint teaching set comprising a base including a generally flat, circular central portion having a circular array of equi-angularly spaced, flat-bottomed recesses adapted to receive replaceable compressed pads containing pigments, said circular array of recesses normally receiving pads of progressively different colors in the color spectrum, said base being continuously bounded by an integral circumferential flange extending rearwardly from the plane of said central portion and having a plurality of substantially flat, individual tab members generally parallel to the plane of said central portion, integral with said flange and extending radially outward therefrom; and a resiliently firm cover having a transparent, circular central window portion rotatively overlaying said central portion so as to be parallel to but displaced forwardly thereof, said cover further having a rearwardly extending cylindrical flange adapted to be slideably received over said base flange and to be frictionally engaged thereby, said cylindrical flange including a relatively flat annular lip portion disposed adjacent the end thereof, said lip portion being substantially parallel to said window portion and being adapted to be slideably disposed against said tab members for rotation thereover, the cylindrical flange and annular lip portion of said cover cooperably engaging the rearwardly extending flange and tab members of said base such that said cover is normally retainably received over said base for rotation with respect thereto while simultaneously being frictionally retained thereover but such that said cover may be separated from said base and removed therefrom by the simultaneous application of manual force to said lip portion in a first direction generally toward said window portion and to at least one of said tab members in the opposite direction so as to overcome the frictional attachment and effect separation, said window portion of said cover including predetermined sets of distinctively and differently lined visible selector indicia viewable from above in juxtaposition relative to the differently colored pads for aiding in selecting, combining and balancing the colors of the spectrum.

2. The paint teaching set of claim 1 further characterized in that said base includes an annular rim raised above the plane of said central portion and integral with said central portion and said rearwardly extending flange, said raised rim encircling the radial periphery of said central portion for providing a sliding surface adapted for engagement with the inside radially peripheral surface of said window portion to facilitate the rotation of said cover with respect to said base.

3. The paint teaching set of claim 1 further characterized in that the radially inner surface of the cover flange includes a plurality of circumferentially spaced, radially inwardly facing frictional protrusions and in that said rearwardly extending base flange has the radially outer surface adjacent said central portion flaring radially outward as it extends rearwardly therefrom and the radially outer surface adjacent the end of said base flange tapering radially inward as it extends toward said end so as to form an annular ridged portion around the outer surface of said flange which is adapted to frictionally engage the protrusions of the inside surface of the cylindrical flange of said cover to normally prevent separation while permitting cover rotation.

4. The paint teaching set of claim 3 further characterized in that the flare of said surface adjacent said central portion makes an acute angle of less than 5° with respect to an axis normal to the plane of said central portion, and the taper of said surface adjacent the end of said base flange makes a greater acute angle with respect to said axis such that when said cover is normally positioned over said base, said protrusions freely ride in the recess created by the inwardly tapered surface to minimize rotational friction.

5. The paint teaching set of claim 1 further characterized in that there are 3N of said spaced recesses where "N" is an even number and in that said cover panel is provided with four sets of said selector indicia, the first set being shaped like an equilateral triangle whose apices serve as a triadic indicator to point out three equally-spaced colors of the spectrum, the second set being in the form of a straight line to serve as a complement indicator such that one end points out the color in the spectrum which is the complement of the color at the opposite end thereof, the third set being Y-shaped and serving as a split complementary indicator such that the top of the "Y" points out the two colors from the color spectrum which diametrically balance an intermediate color whose complement is pointed out by the bottom of the "Y", and the fourth set being three radially-extending line indicators angularly spaced to point to adjacent colors to serve as an analogous color indicator so as to point out three adjacent colors which will provide quiet harmony.

6. The paint teaching set of claim 5 wherein "N"=4 and wherein indicia are provided on the surface of said central portion adjacent each of said recesses for indicating which of said colored pads is to be placed therein.

7. The paint teaching set of claim 1 wherein the plane of the flat bottoms of said recesses is substantially parallel to the plane of the lower surface of said tab members but spaced inwardly therefrom toward said central portion and wherein the outer rim of the base flange is planar with said lower surface of said tab members such that said outer rim and said tab members serve to support said paint set on a surface.

* * * * *